United States Patent [19]

Neyer

[11] 4,407,517
[45] Oct. 4, 1983

[54] PROTECTIVE BOOT FOR SOLENOID

[75] Inventor: James U. Neyer, Lake Bluff, Ill.

[73] Assignee: Synchro-Start Products, Inc., Skokie, Ill.

[21] Appl. No.: 446,960

[22] Filed: Dec. 6, 1982

[51] Int. Cl.³ .......................... F04B 21/00; F16J 15/50
[52] U.S. Cl. ................................ 277/212 FB; 74/18.1
[58] Field of Search .................... 277/212 FB, 212; 74/18.1, 18.2

[56] References Cited

U.S. PATENT DOCUMENTS

| 3,901,518 | 8/1975 | Uchida | 277/212 FB |
| 3,998,466 | 12/1976 | Kondo | 74/18.2 |
| 4,198,825 | 4/1980 | Sakazume | 74/18.2 |
| 4,224,808 | 9/1980 | Gehrke | 277/212 FB |
| 4,295,653 | 10/1981 | Coles | 277/212 FB |
| 4,317,340 | 3/1982 | Hruke et al. | 277/212 FB |

Primary Examiner—Robert I. Smith
Attorney, Agent, or Firm—Kinzer, Plyer, Dorn & McEachran

[57] ABSTRACT

A protective boot of resilient elastomer material comprising a fixed end sealable around a housing opening through which the reciprocal shaft of a solenoid or like device extends and having a movable end sealed to the shaft includes a fluid chamber interconnecting the fixed and movable ends of the boot; the fluid chamber has an unstressed length exceeding the length of the shaft stroke and is formed by a plurality of concave wall portions each extending axially of the shaft, the concave wall portions being forced outwardly of the shaft during retraction movement so that the volume in the fluid chamber remains generally constant.

7 Claims, 5 Drawing Figures

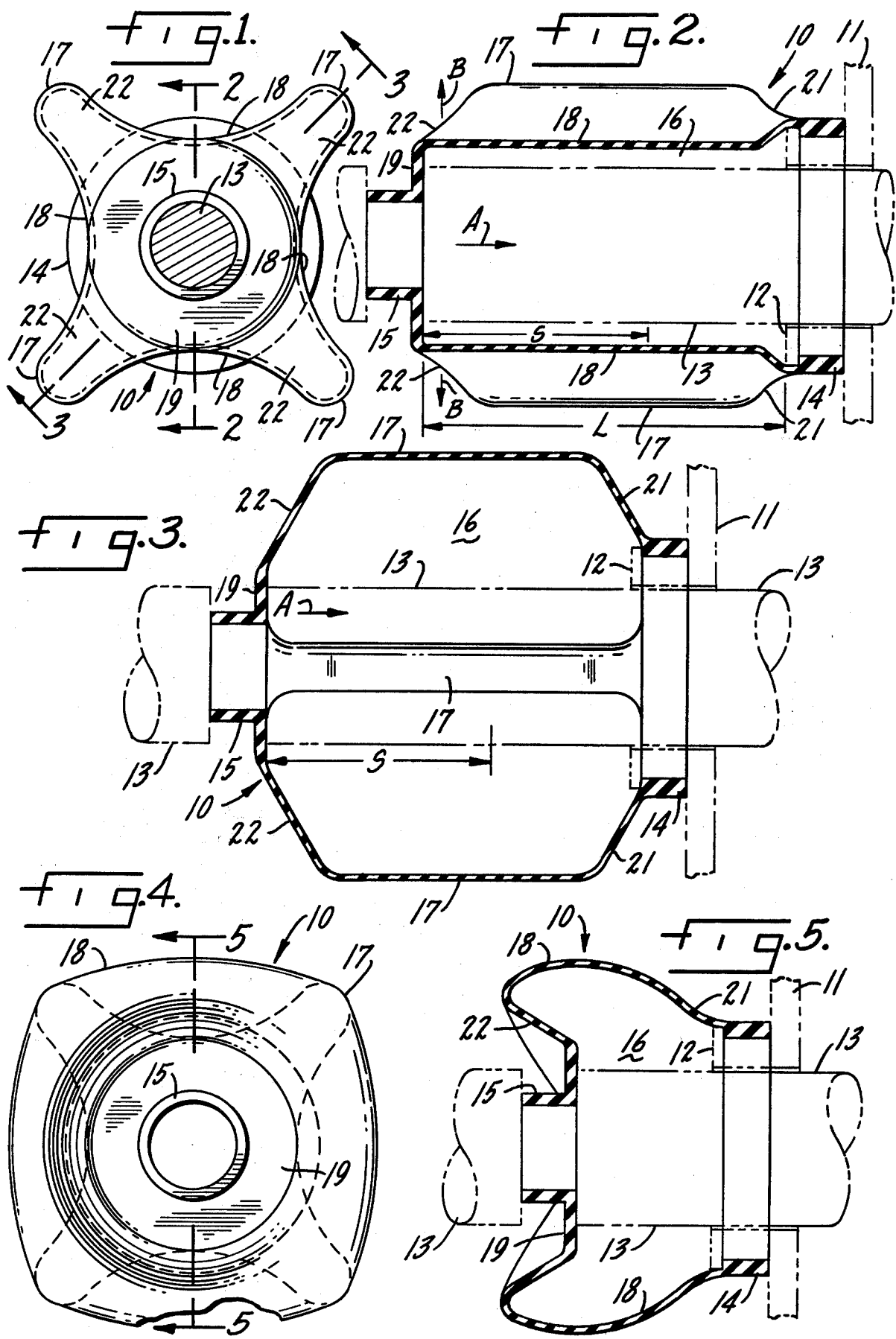

PROTECTIVE BOOT FOR SOLENOID

BACKGROUND OF THE INVENTION

For solenoids used in automotive vehicles, in many industrial applications, and in other applications involving a dusty or dirty environment, severe shortening of the operating life of the solenoid can occur if the solenoid is not adequately protected. Similar problems exist for other devices having axially reciprocal shafts; in many devices of this general kind, it is essential to protect the bearings and other elements of the operating mechanisms from the dust and dirt in the ambient environment.

One conventional protective arrangement comprises a corrugated sleeve or "boot" having one end sealed to the shaft and the other end sealed to the housing of the solenoid or other mechanism that drives the shaft through its reciprocating movement. An ordinary cylindrical sleeve or even a corrugated boot, however, is not particularly effective because the volume enclosed within the sleeve or boot varies excessively as the result of shaft movement. Thus, when the shaft moves inwardly toward the housing to which the other end of the boot is secured, the volume of the space enclosed within the boot decreases substantially. This increases the pressure on the fluid in the boot and tends to force some of that fluid out of the boot, regardless of whether the fluid is air or constitutes oil or other liquid. When the shaft subsequently moves in the opposite direction, away from the fixed end of the sleeve, the volume again expands, reducing the pressure within the boot. This tends to draw contaminated air into the boot. Thus, a protective boot of this kind, while it shields the shaft and the housing opening from direct exposure to a dirty environment, nevertheless allows the introduction of some contaminants into contact with the shaft and the housing opening, with consequent possibility of ultimate damage to the solenoid or like device.

Other protective arrangements for solenoids and similar devices having axially reciprocal shafts have included gasket seals, as shown in Stolp et al U.S. Pat. No. 1,978,916, and flexible diaphragms, as shown in Snyder U.S. Pat. No. 2,427,630 and Baier et al U.S. Pat. No. 3,142,790. Like a corrugated boot, however, when applied to a device having a shaft projecting from only one side of a housing these arrangements result in substantial changes in the volume of air or other fluid enclosed within the device. A modified diaphragm protection arrangement is shown in two United States patents to Immel, U.S. Pat. Nos. 2,858,487 and 2,853,660. The Immel arrangement uses two diaphragms instead of one, with the two diaphragms located on opposite ends of a solenoid assembly, both diaphragms being of generally cup-shaped configuration with the concave portion of one diaphragm facing the convex portion of the other. In this arrangement, when the shaft moves axially the distortion of the two diaphragms is matched and the volume of fluid, enclosed within the housing of the device, which may be air or oil, remains essentially constant. However, this construction can only be applied to a device in which both ends of the operating shaft are accessible and requires a special housing for the device.

Another arrangement for environmental protection of a reciprocating shaft in an electromagnetic device is the valve construction shown in Delaporte et al U.S. Pat. No. 3,098,635. That arrangement employs a single diaphragm which has one end sealed to the housing of the electromagnetic device and the other end sealed to the projecting shaft of the device. The diaphragm turns inside out during each stroke of the shaft and is said to maintain a constant volume of fluid in a chamber enclosing a part of the shaft, though it appears that there must be pressure changes occurring immediately before and after the diaphragm reverses its direction of curvature. Furthermore, the Delaporte arrangement requires a special housing construction and would not be readily adaptable to other types of housings, and has the additional disadvantage that repeated operation, with the diaphragm turning inside out with a 180° reversal on every stroke, would be likely to lead to early fatigue and failure of the diaphragm.

SUMMARY OF THE INVENTION

It is a principal object of the present invention, therefore, to provide a new and improved protective boot for a solenoid or like device of the kind comprising a reciprocally movable shaft projecting through an opening in a housing, which boot, though simple and inexpensive in construction, is readily adaptable to use with housings of a wide variety of different constructions and maintains a generally constant volume within the boot at all times.

A further object of the invention is to provide a new and improved protective boot for a solenoid or like reciprocating shaft device that affords effective protection for the shaft and the housing opening over a long period of time, comparable to the operating life expectancy of the device itself.

Accordingly, the invention relates to a protective boot for a solenoid or like device of the kind comprising a housing having an opening through which a shaft projects, the shaft being reciprocally axially movable through a stroke of given length between an extended position and a retracted position relative to the housing. The boot is of resilient elastomer material and comprises a fixed end adapted to be sealed to the housing around the opening through which the shaft extends, a movable end adapted to be sealed to the shaft, and a fluid chamber extending between the fixed end and the movable end of the boot in encompassing relation to a portion of the shaft, the fluid chamber having an unstressed axial length exceeding the aforesaid stroke length. The fluid chamber includes a plurality of concave wall portions each extending axially of the shaft, which concave wall portions are forced outwardly of the shaft by the resiliency of the boot during movement of the shaft toward its retracted position, so that the volume of the fluid chamber remains generally constant during reciprocal movements of the shaft.

BRIEF DESCRIPTION OF THE DRAWINGS

FIG. 1 is an end elevation view of a protective boot for a solenoid or like reciprocating shaft device constructed in accordance with a preferred embodiment of the present invention, the boot being shown in an unstressed condition;

FIG. 2 is a longitudinal sectional elevation view taken approximately as indicated by line 2—2 in FIG. 1;

FIG. 3 is a longitudinal sectional elevation view taken approximately as indicated by line 3—3 in FIG. 1;

FIG. 4 is an end elevation view corresponding to FIG. 1 but showing the boot configuration with the shaft retracted; and FIG. 5 is a longitudinal sectional elevation view taken approximately as indicated by line 5—5 in FIG. 4.

DESCRIPTION OF A PREFERRED EMBODIMENT

FIGS. 1-5 illustrate a protective boot 10, comprising a preferred embodiment of the present invention, for a solenoid or like reciprocating shaft device. The protective boot 10 is formed throughout of resilient elastomer material and may be manufactured, for example, by a dip molding process. The specific elastomer selected for boot 10 is subject to substantial variation; natural rubber or virtually any synthetic rubber can be utilized. One particularly suitable material is Neoprene. In FIGS. 1-3 the protective boot 10 is shown in its unstressed or relaxed condition; in FIGS. 4 and 5 the boot is illustrated in its stressed or contracted operating condition.

The solenoid or other device with which the boot 10 is utilized includes a housing, generally represented by a housing wall 11 shown in phantom outline in FIGS. 2, 3 and 5. The housing wall 11 includes an opening encompassed by a collar 12. The shaft 13 of the protective device, shown in phantom outline in FIGS. 2, 3 and 5, projects through and beyond the opening afforded by collar 12. Shaft 13 is reciprocally axially movable, through a stroke of given length S, between an extended position shown in FIGS. 2 and 3 and a retracted position, relative to the housing, shown in FIG. 5.

The protective boot 10 includes a fixed end, shown as a collar 14, that is adapted to be sealed to the housing wall 11 around the opening through which shaft 13 projects. In the illustrated construction, collar 14 of boot 10 fits into an annular groove in housing collar 12. However, collar 14 may be adhesively sealed to housing collar 12 or may be clamped to collar 12 to seal the boot to the housing. In some instances a stretch fit of the elastomer collar 14 over the housing collar 12 may provide an adequate seal. In other instances, depending upon the housing configuration, it may be desirable to provide a radially extending flange on the fixed end 14 of boot 10 in order to afford an appropriate arrangement for sealing that end of the boot to the housing of the protected device.

The protective boot 10 further comprises a movable end 15 that is adapted to be mounted in sealing engagement onto the reciprocal shaft 13. In the illustrated embodiment, the movable end of boot 10 comprises a short collar 15 that fits tightly into an annular groove in shaft 13. Again, collar 15 may be cemented to the shaft, or a stretch fit of the elstomer collar 15 over shaft 13 may provide an adequate seal. As in the case of the fixed end 14 of the boot, however, the movable end 15 of the boot may be varied in configuration to suit the requirements of the protected device, and any appropriate arrangement for mounting the movable boot end 15 in sealed relation onto shaft 13 can be employed.

The portion of boot 10 intermediate its fixed end 14 and its movable end 15 encloses a fluid chamber 16, which encompasses a substantial volume along shaft 13. Chamber 16 has a length L (FIG. 2) exceeding the stroke length S for shaft 13. Preferably, the length L of the enclosed fluid chamber 16 within boot 10 is at least fifty percent greater than the stroke S for the shaft. For the specific boot 10 shown in the drawings, L=1.6 inches and S=1 inch.

The intermediate portion of boot 10 between fixed end 14 and movable end 15 comprises a series of outwardly displaced convex lobe wall portions 17 interconnecting a corresponding plurality of concave wall portions 18, the lobes 17 and the concave wall portions 18 each extending axially along shaft 13. As can be readily seen in FIG. 1, the inward curvature of the concave wall portions 18 is sufficient so that the enclosed volume of the fluid chamber 16 is substantially smaller than would be the case if boot 10 were an ordinary cylindrical sleeve having a radius equal to the radius of the lobes 17. That is, the major portion of the circumference of chamber 16 is enclosed by the concave wall portions 18; by comparison, the circumferential extent of lobes 17 is quite small. The ends 21 and 22 of each lobe 17 sope into the ends 14 and 15, respectively, of boot 10.

In a typical construction, the wall thickness for the lobe and concave wall portions 17 and 18 of boot 10 may be of the order of 0.025 inch. The ring shaped end wall 19 at the front of boot 10, which joins the movable end collar 15 to the walls of chamber 16, may have a thickness of approximately 0.05 inch. The fixed end collar 14 of the boot may be somewhat thicker, of the order of 0.15 inch in a typical construction. It should be understood that these dimensions are given merely by way of example and are subject to substantial variation. Indeed, wall thicknesses may be the same throughout boot 10. It is essential that the walls of boot 10 encompassing chamber 16, and particularly the concave wall portions 18, be highly flexible and resilient.

FIGS. 4 and 5 illustrate the effect on boot 10 of a retraction movement of shaft 13 toward housing 11 through its stroke length S, in the direction indicated by arrow A in FIG. 2. Referring first to FIG. 2, as shaft 13 begins its retracting movement in the direction of arrow A it is apparent that the concave wall portions 18 must be displaced. The lobes 17 prevent inward deflection of the concave wall portions 18 toward shaft 13. Consequently, as shaft 13 moves in the direction of arrow A, the concave wall portions 18 are deflected outwardly as indicated by the arrows B (FIG. 2).

By the time shaft 13 has completed its full retraction movement through the stroke length S, the concave wall portions 18 of boot 10 are forced outwardly, due to the resiliency and configuration of the boot, to the shape shown in FIGS. 4 and 5. Of course, this change of configuration occurs gradually during the shaft movement. As the shaft retracts in the direction of arrow A, the overall length of fluid chamber 16 shortens, tending to reduce the fluid chamber volume. At the same time, however, the effective diameter of much of chamber 16, particularly in the portion of the chamber adjacent the movable end 15 of boot 10, increases materially in a radial direction. As a result, the volume of fluid chamber 16 remains generally constant throughout the retraction movement of shaft 13. The shape of wall portions 18 shown in FIG. 5 is subject to variation, depending on the stroke length S, the wall thickness of boot 10, the elastomer used in the boot, and other factors.

The same action occurs in reverse whenever shaft 13 moves axially from the retracted position shown in FIGS. 4 and 5 to the fully extended and unstressed condition shown in FIGS. 1-3. The movable end 15 of boot 10, being sealed to shaft 13, moves outwardly away from housing 11 along with the shaft. As it does so, the concave wall portions 18 of boot 10 progressively decrease in effective radius, particularly at the movable end of the boot, maintaining an essentially constant volume in chamber 16 at all times.

Boot 10, as illustrated, has four maximum diameter lobes 17 interconnected by four longitudinal concave wall portions 18. This number is subject to variation, however. There should preferably be at least three lobes 17 to assure a stable configuration for boot 10. On the other hand, the number of lobes 17 can be increased to six or even more if preferred.

Boot 10 is a simple, one-piece device that is quite inexpensive to manufacture; it may be made by dip molding or by injection molding or other techniques. The fixed end portion 14 of boot 10 can be readily modified to adapt the boot to use with virtually any kind of housing. The angular deflection for any given portion of the flexible walls of the boot is relatively limited (usually less than 45°) so that the boot exhibits a long life, a life that may often be comparable to the operating life expectancy of the device it is employed to protect. Nevertheless, boot 10 provides effective protection for shaft 13 and for the operating mechanism of the device enclosed within housing 11, since, by maintaining a generally constant volume within chamber 16, any tendency to substantial pressure changes that could draw contaminants into the chamber is effectively avoided. Indeed, because chamber 16 does not change appreciably in volume, boot 10 provides highly effective protection even when the seal at either end 14 or end 15 is less than ideal.

I claim:

1. A protective boot for a solenoid or like device of the kind comprising a housing having an opening through which a shaft projects, the shaft being reciprocally axially movable through a stroke of given length between an extended position and a retracted position relative to the housing, the boot being of resilient elastomer material and comprising:

a fixed end adapted to be sealed to the housing around the opening through which the shaft extends;

a movable end adapted to be sealed to the shaft;

and a fluid chamber extending between the fixed end and the movable end of the boot in encompassing relation to a portion of the shaft, the fluid chamber having an unstressed axial length exceeding the aforesaid stroke length, the fluid chamber including a plurality of concave wall portions each extending axially of the shaft, which concave wall portions are forced outwardly of the shaft by the resiliency of the boot during movement of the shaft toward its retracted position, so that the volume of the fluid chamber remains generally constant during reciprocal movements of the shaft.

2. A protective boot for a solenoid or like reciprocating shaft device, according to claim 1, in which the movable end of the boot comprises a radially extending ring-shaped end wall having a radius corresponding approximately to the innermost part of the concave wall portions of the fluid chamber.

3. A protective boot for a solenoid or like reciprocating shaft device, according to claim 2, in which the movable end wall is substantially thicker than the walls of the fluid chamber.

4. A protective boot for a solenoid or like reciprocating shaft device, according to claim 1, in which the concave wall portions of the fluid chamber are interconnected by a corresponding plurality of convex lobe wall portions each extending axially of the shaft, the opposite ends of each lobe wall portion sloping into the fixed and movable ends of the boot.

5. A protective boot for a solenoid or like reciprocating shaft device, according to claim 1, in which the circumferential extent of the lobe portions is much smaller than the circumferential extent of the concave wall portions.

6. A protective boot for a solenoid or like reciprocating shaft device, according to claim 5, in which the movable end of the boot comprises a radially extending ring-shaped end wall having a radius corresponding approximately to the innermost part of the concave wall portions of the fluid chamber.

7. A protective boot for a solenoid or like reciprocating shaft device, according to claim 3, in which the movable end wall is substantially thicker than the walls of the fluid chamber.

* * * * *